(12) United States Patent
Duan (10) Patent No.: US 12,373,154 B2
(45) Date of Patent: Jul. 29, 2025

(54) SPLICED DISPLAY SCREEN REDUCING HASHRATE OF INNER PROCESSING ALGORITHM

(71) Applicant: BOE Technology Group Co., Ltd., Beijing (CN)

(72) Inventor: Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/695,816

(22) PCT Filed: Jul. 31, 2023

(86) PCT No.: PCT/CN2023/110111
§ 371 (c)(1),
(2) Date: Mar. 26, 2024

(87) PCT Pub. No.: WO2024/051386
PCT Pub. Date: Mar. 14, 2024

(65) Prior Publication Data
US 2024/0411499 A1    Dec. 12, 2024

(30) Foreign Application Priority Data

Sep. 7, 2022  (CN) .......................... 202211089303.6

(51) Int. Cl.
*G06F 3/14*    (2006.01)
(52) U.S. Cl.
CPC ................. *G06F 3/1446* (2013.01)

(58) Field of Classification Search
CPC ........ G06F 3/14; G06F 3/1446; G06F 3/1454; G06F 3/147; G06F 3/1423; G06F 3/1431;
(Continued)

(56) References Cited

U.S. PATENT DOCUMENTS

| | | | |
|---|---|---|---|
| 11,954,394 B2 * | 4/2024 | Duan | G06F 3/1407 |
| 2013/0181884 A1 * | 7/2013 | Perkins | G06F 3/1423 345/1.3 |

(Continued)

FOREIGN PATENT DOCUMENTS

| | | |
|---|---|---|
| CN | 101540160 A | 9/2009 |
| CN | 102226943 A | 10/2011 |

(Continued)

*Primary Examiner* — Ke Xiao
*Assistant Examiner* — Nelson Lam
(74) *Attorney, Agent, or Firm* — IPro, PLLC (57) ABSTRACT

Provided is a spliced display screen. The spliced display screen includes a plurality of display screen modules, a plurality of control modules, and a communication bus; an image processing algorithm is configured in each control module; the each of the plurality of control modules is configured to receive video information and send an edge signal supplement request to other control modules; determine whether the communication bus is occupied by the each of the plurality of control modules; determine the each of the plurality of control modules as a master control module and other control modules as slave control modules; read at least part of edge information via the communication bus; and perform imaging processing on the received video information and multiple pieces of the at least part of edge information to generate image sub-information; and the plurality of display screen modules are configured to display received image sub-information.

14 Claims, 4 Drawing Sheets

(58) Field of Classification Search
CPC ...... G06F 3/1438; G09G 5/001; G09G 5/003;
G09G 5/005; G09G 5/006
USPC .................................................. 345/1.1–1.3
See application file for complete search history.

(56) References Cited

U.S. PATENT DOCUMENTS

| | | | |
|---|---|---|---|
| 2015/0213745 A1* | 7/2015 | Kim ..................... | G06F 3/1446 |
| | | | 345/1.1 |
| 2015/0287390 A1* | 10/2015 | Kakeko ............... | H04L 61/5038 |
| | | | 345/1.1 |
| 2016/0034242 A1* | 2/2016 | Cho ..................... | G06F 3/1446 |
| | | | 345/1.3 |
| 2016/0062725 A1* | 3/2016 | Odagiri ................ | G06F 3/1446 |
| | | | 345/1.3 |
| 2016/0162247 A1* | 6/2016 | Bryczkowski ...... | G06F 11/3003 |
| | | | 345/1.3 |
| 2016/0342376 A1* | 11/2016 | Liang ................... | G09G 5/003 |
| 2021/0011820 A1* | 1/2021 | Kim ..................... | G06F 3/1446 |
| 2021/0407374 A1* | 12/2021 | Moriwaki ............ | G09G 3/2096 |

FOREIGN PATENT DOCUMENTS

| | | |
|---|---|---|
| CN | 103337234 A | 10/2013 |
| CN | 106373493 A | 2/2017 |
| CN | 111193953 A | 5/2020 |
| CN | 112286474 A | 1/2021 |
| CN | 115686409 A | 2/2023 |
| KR | 20110122372 A | 11/2011 |

\* cited by examiner

SPLICED DISPLAY SCREEN REDUCING HASHRATE OF INNER PROCESSING ALGORITHM

CROSS-REFERENCE TO RELATED APPLICATION

This application is a U.S. national stage of international application No. PCT/CN2023/110111, filed on Jul. 31, 2023, which claims priority to Chinese Patent Application No. 202211089303.6, filed on Sep. 7, 2022, the disclosures of which is are herein incorporated by references in their entireties.

TECHNICAL FIELD

The present disclosure relates to the field of display technologies, in particular to a spliced display screen and a control system for a spliced display screen.

BACKGROUND

With the rapid development of the display technologies, the display screens are increasingly diverse, and splicing screens are emerging display technologies in recent years. Generally, a complete spliced device, that is, a spliced display screen is spliced by several smaller display screen modules.

SUMMARY

In some embodiments of the present disclosure, technical solutions of a spliced display screen are provided to solve the technical problems of the present disclosure. The spliced display screen incudes: a plurality of display screen modules spliced with each other, a plurality of control modules, and a communication bus; wherein one of the plurality of display screen modules corresponds to one of the plurality of control modules, an image processing algorithm is configured in each of the plurality of control modules, and the plurality of control modules are communicably connected via the communication bus;

the each of the plurality of control modules is configured to send an edge signal supplement request to other control modules in the spliced display screen in response to received video information, wherein the edge signal supplement request carries address information of at least part of other control modules than the each of the plurality of control modules; determine, based on the address information, whether the communication bus is occupied by the each of the plurality of control modules; determine the each of the plurality of control modules as a master control module and other control modules corresponding to the address information occupying the communication bus as slave control modules in response to the communication bus being occupied by the each of the plurality of control modules; read at least part of edge information of the video information received by the slave control modules via the communication bus in response to acquiring a control right over the communication bus; release control over the communication bus for a new occupation of the communication bus among the other control modules; and perform imaging processing on the received video information and multiple pieces of the at least part of edge information in response to reading the multiple pieces of the at least part of edge information from the at least part of other control modules, such that image sub-information for displaying is generated; and the plurality of display screen modules are configured to display received image sub-information.

In some embodiments, in a case that the communication bus is occupied by a plurality of master control modules simultaneously, each of the plurality of master control modules is further configured to determine whether the each of the plurality of master control modules has the control right over the communication bus;

the each of the plurality of master control modules includes a determining unit and a reading unit; wherein the determining unit is configured to send preconfigured reading codes to the slave control modules, and determine, based on the reading codes, whether the each of the plurality of master control modules has the control right over the communication bus; and the reading unit is configured to send an information read request to the slave control modules in response to the each of the plurality of master control modules having the control right over the communication bus, and read the at least part of edge information fed back from the slave control modules via the communication bus; and release the control over the communication bus for the new occupation of the communication bus among the other control modules;

each of the slave control modules includes a receiving unit and a sending unit; wherein the receiving unit is configured to determine the at least part of edge information of the received video information in response to the received reading codes; and the sending unit is configured to send the at least part of edge information to the reading unit in response to the received information read request.

In some embodiments, the determining unit is configured to sequentially send data bits of the reading codes to the communication bus, and determine whether a logic level of a currently-sent data bit is coincident with a logic level of the communication bus at a current time each time one of the data bits is sent; and determine that the each of the plurality of master control modules has the control right over the communication bus in response to the logic level of the currently-sent data bit being coincident with the logic level of the communication bus at the current time and the logic level of the currently-sent data bit being a low level.

In some embodiments, the each of the plurality of control modules is configured to sequentially send data bits of the address information to the communication bus, and determine that the communication bus is occupied by the each of the plurality of control modules in response to a currently-sent data bit being a low level and a logic level of the communication bus being adjusted to the low level; and the communication bus is configured to adjust the logic level of the communication bus to the low level in response to a logic level of a data bit of the received address information sent by any of the plurality of control modules being the low level.

In some embodiments, the edge signal supplement request carries at least one data byte, wherein a first bit of the data byte is configured to represent a data bit of read control or write control;

each of the slave control modules is configured to detect, in response to the edge signal supplement request and a received first data bit being a write control bit, whether the received address information is coincident with predetermined address information; and feed back a response signal to the each of the plurality of master control modules in response to the received address information being coincident with the predetermined address information; and the each of the plurality of master control modules is configured to receive the response signal from the each of the slave control modules, and read, in response to acquiring the control right over the communication bus, part of edge information of the video information received by the slave control modules via the communication bus; and release the control over the communication bus.

In some embodiments, the each of the plurality of control modules further includes a clock unit, wherein an initial state of a logic level of the clock unit is a high level state; the communication bus includes a data signal line and a clock signal line, wherein an initial state of a logic level of the clock signal line is the high level state;

the clock unit is configured to detect the logic level of the clock signal line; adjust the logic level in the high level state to a low level in response to a shift of the logic level of the clock signal line from the high level to the low level, and adjust the logic level in a low level state to the high level upon maintaining of the low level state for a predetermined low level period; adjust the clock signal line to be in a high level waiting state in response to the logic level of the clock signal line being maintained at the low level state; count high level periods of the clock signal line in response to a shift of the logic level of the clock signal line from the low level to the high level, and adjust the logic level of the clock signal line in the high level state to the low level in response to the high level periods of the clock signal line being less than high level periods of the clock unit of any of the other control modules; and the clock signal line is configured to detect logic levels of the clock units of the plurality of control modules in response to the shift of the logic level of the clock signal line from the high level to the low level and maintaining of the logic level of the clock signal line at the low level state; and adjust the logic level of the clock signal line to the high level in response to the logic levels of the clock units of the plurality of control modules being high levels.

In some embodiments, a low level period of the clock signal line is greater than a low level period of any clock unit.

Some embodiments of the present disclosure further provide a control system for a spliced display screen. The control system for the spliced display screen includes the spliced display screen as described in the above embodiments.

In some embodiments, the control system for the spliced display screen further includes a playback control module and a data sending module; wherein the playback control module is configured to send a video stream to the data sending module via a video interface;

the data sending module is configured to acquire video information corresponding to the plurality of control modules by blocking each video frame in the video stream based on the video stream, a video resolution of the video stream, and a number of display screen modules; and send the video information to the corresponding control modules; and the spliced display screen is configured to display the received video information.

In some embodiments, the data sending module includes a configuring unit, a blocking unit, and a sending unit; wherein the configuring unit is configured to receive configuration information from a user terminal, wherein the configuration information includes address information of the plurality of control modules and the number of the display screen modules;

the blocking unit is configured to acquire the video information corresponding to the plurality of control modules by blocking each video frame in the video stream based on the video stream, the video resolution of the video stream, and the number of display screen modules; and the sending unit is configured to send the video information to the corresponding control modules based on the address information of the plurality of control modules.

BRIEF DESCRIPTION OF DRAWINGS

FIG. 5b is a schematic diagram of division of an edge position region of a display screen module 1 in FIG. 5a;

DETAILED DESCRIPTION

For clearer descriptions of the objects, technical solutions, and advantages of the embodiments of present disclosure, the technical solutions of the embodiments of the present disclosure are described clearly and completely hereinafter in combination with the accompanying drawings in the embodiments of the present disclosure. It is obvious that the described embodiments are merely part but not all of the embodiments of the present disclosure. Generally, assemblies of the embodiments of the present disclosure described and shown in the accompanying drawings herein can be arranged and designed in various configurations. Thus, detailed descriptions of the embodiments of the present disclosure in the accompanying drawings hereinafter are not intended to limit the claimed protection scope, and only represent the specific embodiments of the present disclosure. All other embodiments derived by those skilled in the art without creative efforts based on the embodiments in the present disclosure are within the protection scope of the disclosure.

It should be noted that unless otherwise defined, technical or scientific terms used in the embodiments of the present disclosure shall have ordinary meaning understood by persons of ordinary skill in the art to which the disclosure belongs. The terms "first," "second," and the like used in the embodiments of the present disclosure are not intended to indicate any order, quantity or importance, but are merely used to distinguish the different components. The terms "a," "an," and the like are not intended to limit the quantity, and only represent that at least one exists. The terms "comprise" or "include" and the like are used to indicate that the element or object preceding the terms covers the element or object following the terms and its equivalents, and shall not be understood as excluding other elements or objects. The terms "connect" or "contact" and the like are not intended to be limited to physical or mechanical connections, but may include electrical connections, either direct or indirect connection. The terms "on," "under," "left," and "right" are only used to indicate the relative positional relationship. When the absolute position of the described object changes, the relative positional relationship may change accordingly.

The term "a plurality of or several" herein means two or more. The term "and/or" describes associations between associated objects, and indicates three types of relationships. For example, "A and/or B" indicates that A alone, A and B, or B alone. The character "/" generally indicates that the associated objects are in an "or" relationship.

In some practices, as a splicing gap is present between the display screen modules of the spliced display screen, a display effect of the screen is poor in the splicing regions. Thus, a smoother transitional screen between the display screen modules spliced with each other is acquired by processing the screens displayed by the display screen modules and edge pixel information of the surrounding display screen modules by the splicing system configured with the image processing algorithm. However, in this method, requirements for the splicing system configured with an image processing algorithm are great, and the splicing system requires a great hashrate (the splicing system requires to perform unified calculation on the screens displayed by the display screen modules and the edge pixel information of the surrounding display screen modules) to achieve the image processing of the display screens, such that the processing pressure of the splicing system is greatly increased.

Thus, the embodiments of the present disclosure provide a spliced display screen. The spliced display screen includes a plurality of display screen modules spliced with each other and a plurality of control modules. One of the plurality of display screen modules corresponds to one of the plurality of control modules. In the spliced display screen according to the embodiments of the present disclosure, the image processing algorithm is configured in the control modules corresponding to the display screen modules, such that the pressure of the image processing algorithm in unified image processing processes in some practices is shared, each control module only needs to process the screen for displaying, and the hashrate of the inner image processing algorithm is greatly reduced.

Figure 1:
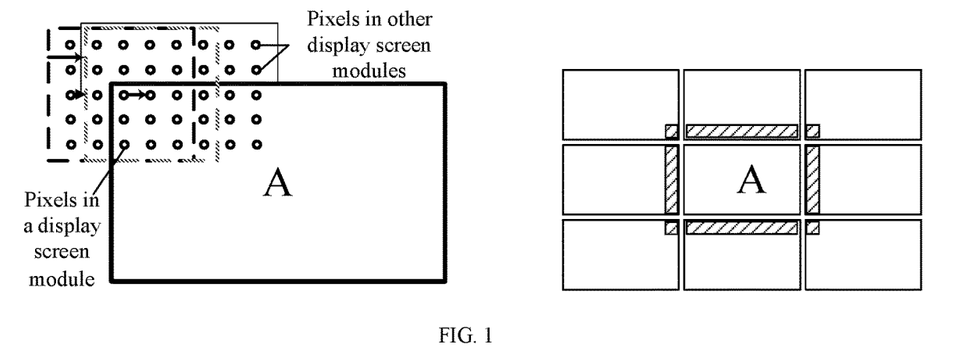
FIG. 1 is a schematic diagram of supplement of edge information according to some embodiments of the present disclosure.

It should be noted that in the case that the images are assigned to the image processing algorithms in the control modules for processing, the pixels in the boundary of the images are not complete, and the display effect is poor due to the splicing gap between the display screen modules spliced with other. Specifically, as shown in FIG. 1, FIG. 1 is a schematic diagram of supplement of edge information according to some embodiments of the present disclosure. The black dashed line box indicates a 5×5 filter kernel, and the gray dashed line box indicates a 5×5 filter kernel upon a shift of one step size. For example, the image processing algorithm processes pixels in the display screen modules with the 5×5 filter kernel and the step size of 1, and it is unavoidable to require edge pixels displayed in other display screen modules in processing the edge pixels in the display screen module. Thus, for improvement of the display effect of the splicing screen and a smoother transitional screen displayed between the display screen modules spliced with each other, the spliced display screen in the embodiments of the present disclosure further includes a communication bus, and the communicable connection between the control modules is achieved via the communication bus. The communication bus in the embodiments of the present disclosure is various buses supporting multi-host communication and possessing the arbitration mechanism, for example, an I2C bus. The "host" herein is the control module. The embodiments of the present disclosure are described by taking the I2C as an example. All control modules are connected to one communication bus. For avoiding the request conflict caused by the simultaneous requests of the plurality of control modules via the communication bus, the "arbitration" mechanism is further configured between the control modules and the communication bus in the embodiments of the present disclosure, and the detailed descriptions are referred to the following two arbitration processes, which are not detailed herein. The control module utilizes the data transition function of the communication bus and the logic function of the "arbitration" mechanism to acquire information of edge pixels of other control modules without conflict, such that the image displayed by the control module is optimized, and the consistence of the display effect of the spliced display screen is improved.

Figure 2:
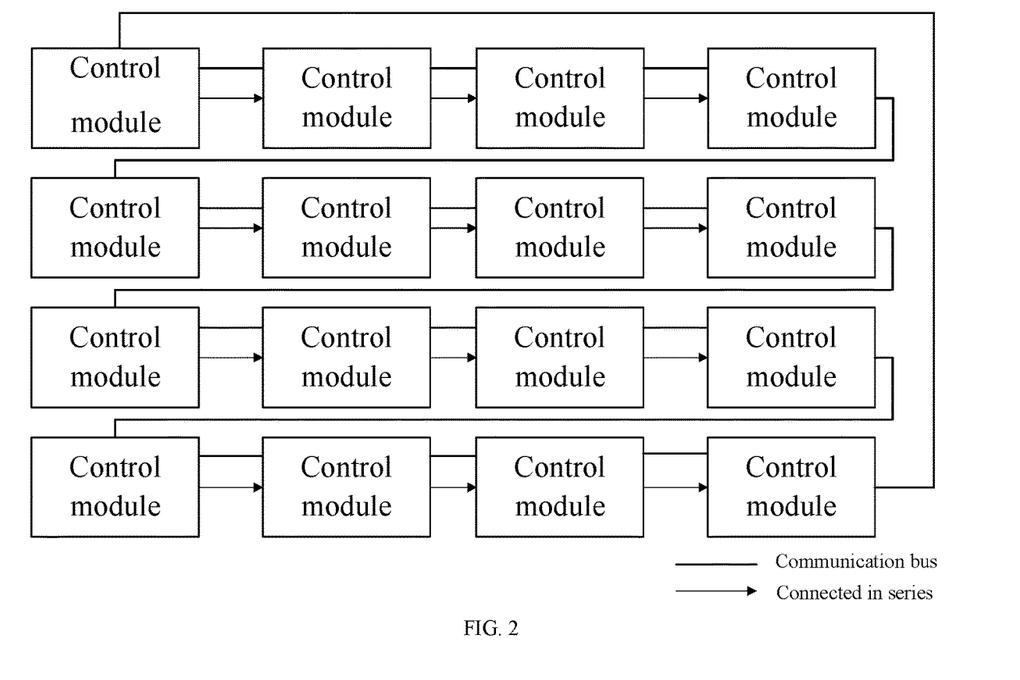
FIG. 2 is a schematic structural diagram of a spliced display screen according to some embodiments of the present disclosure.

The following embodiments describe the structure of the spliced display screen in detail. FIG. 2 is a schematic structural diagram of a spliced display screen according to some embodiments of the present disclosure. As shown in FIG. 2, FIG. 2 shows 4*4 display screen modules. Each row of display screen modules are connected in series to acquire four sets, the connection line without the arrow represents the communication bus, and the serpentine wiring mode achieves communicable connection between the control modules, reduces the wiring complexity, and avoids confusing connections between the control modules.

The control module is configured to send an edge signal supplement request to other control modules in the spliced display screen in response to received video information. The edge signal supplement request carries address information of at least part of other control modules than the control module. The control module and the other control modules are differed in that the other control modules are control modules in the plurality of control modules other than the control module. The address information of the at least part of other control modules is predetermined address information of specific control modules related to the control module, for example, address information of control modules adjacent to the control module. The address information herein can be referred to an identification representing the other control module, for example, an identity document (ID) predetermined for the control module, which is "1" representing a high level and "0" representing a low level in a logic level. The video information is information of the video frame in the external playback source partitioned and sent to the control module, and is the video signal including partial video frames. The partial video frame can be understood as a sub-image for displaying by the display screen module corresponding to the control module.

Furthermore, the control module is configured to determine, based on the address information, whether the communication bus is occupied by the each of the plurality of control modules. This is the first arbitration. In the case that the communication bus is occupied by the control module, the control module is determined as a master control module, and other control modules corresponding to the address information occupying the communication bus are determined as slave control modules. Prior to the determination of whether the communication bus is occupied, the same control module is capable of actively sending the edge signal supplement request and passively receiving the address information carried in the edge signal supplement request sent by other control modules. Upon the determination of whether the communication bus is occupied, the control module is determined as the master control module in response to the communication bus being occupied by the control module, the control module is capable of transmitting data via the communication bus, and the other control modules are not capable of transmitting data via the communication bus. It should be noted that in some embodiments, various control modules send the edge signal supplement requests simultaneously, and determine whether the communication bus is occupied by themselves based on the address information. Thus, at least one master control module occupying the communication bus is present in the plurality of control modules.

Figure 3:
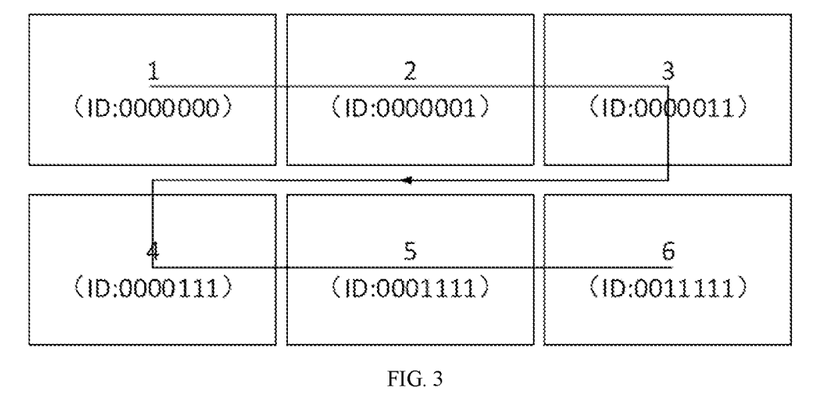
FIG. 3 is a schematic diagram of ranking of priorities according to some embodiments of the present disclosure.

Illustratively, the communication bus has a "wired and" logic function. For example, in the logic level, a low level 0 and a low level 0 is a low level 0, a low level 0 and a high level 1 is a low level 0, and a high level 1 and a high level 1 is a high level 1. That is, in the case that one control module sends a low level, the communication bus shows a low level. FIG. 3 is a schematic diagram of ranking of priorities according to some embodiments of the present disclosure. Assuming that one spliced display screen includes 3*2 display screen modules spliced with each other, as shown in FIG. 3, address information of the display screen module 1 (that is, address information of the control module corresponding to the display screen 1) is predetermined as 0000000, address information of the display screen module 2 is predetermined as 0000001, address information of the display screen module 3 is predetermined as 0000011, address information of the display screen module 4 is predetermined as 0000111, address information of the display screen module 5 is predetermined as 0001111, and address information of the display screen module 6 is predetermined as 0011111. The priority of the display screen module 1 is greatest, and the priority is sequentially reduced in serpentine arrangement order. The "priority of the control module" can be understood as that the communication bus can be transferred from a high level state to a low level state preferentially relative to other control modules in the case that the address information of the control module is received by the communication bus, that is, the communication bus is occupied in this case. The display scree 1 is determined as the slave control module at first, and the control module with the address information of 0000000 is determined as the master control module at first.

As shown in FIG. 3, by taking the control module being the control module corresponding to the display screen module 1 as an example, the edge signal supplement request sent by the control module corresponding to the display screen module 1 carries the address information of 0000001 of the display screen module 2, the address information of 0000111 of the display screen module 4, and the address information of 0001111 of the display screen module 5. By taking the control module being the control module corresponding to the display screen module 2 as an example, the edge signal supplement request sent by the control module corresponding to the display screen module 2 carries the address information of 0000000 of the display screen module 1, the address information of 0000011 of the display screen module 3, the address information of 0000111 of the display screen module 4, the address information of 0001111 of the display screen module 5, and the address information of 0011111 of the display screen module 6. By taking the control module being the control module corresponding to the display screen module 3 as an example, the edge signal supplement request sent by the control module corresponding to the display screen module 3 carries the address information of 0000001 of the display screen module 2, the address information of 0001111 of the display screen module 5, and the address information of 0011111 of the display screen module 6. By taking the control module being the control module corresponding to the display screen module 4 as an example, the edge signal supplement request sent by the control module corresponding to the display screen module 4 carries the address information of 0000000 of the display screen module 1, the address information of 0000001 of the display screen module 2, and the address information of 0001111 of the display screen module 5. By taking the control module being the control module corresponding to the display screen module 5 as an example, the edge signal supplement request sent by the control module corresponding to the display screen module 5 carries the address information of 0000000 of the display screen module 1, the address information of 0000001 of the display screen module 2, the address information of 0000011 of the display screen module 3, the address information of 0000111 of the display screen module 4, and the address information of 0011111 of the display screen module 6. Based on the "wired and" logic function of the communication bus, the address information 0000000 is a response with a highest priority, that is, the communication bus is preferentially occupied by the control module sending the address information based on the address information of 0000000. For example, the control module corresponding to the above display screen module 2 determines that the communication bus is occupied by the control module itself based on the sent address information of 0000000, the control module corresponding to the above display screen module 4 determines that the communication bus is occupied by the control module itself based on the sent address information of 0000000, the control module corresponding to the above display screen module 5 determines that the communication bus is occupied by the control module itself based on the sent address information of 0000000. Thus, the control modules corresponding to the display screen modules 2, 4 and 5 are determined as the master control modules, and the control module of the corresponding display screen module 1 occupying the address information of 0000000 of the communication bus is determined as the slave control module.

In the case that the control module determines that the communication bus is occupied by the control module, the control module is determined as the master control module, and the following processes of the control module are performed in the case that the control module is determined as the master control module. Furthermore, the master control module is configured to read at least part of edge information of the video information received by the slave control modules via the communication bus in response to acquiring a control right over the communication bus; and release control over the communication bus for a new occupation of the communication bus among the other control modules.

At least one master control module is present in the plurality of control modules, and the master control module directly acquires the control right over the communication bus in the case that only one master control module is present. In the case that several master control modules are present, the fight for the control right over the communication bus is performed among the several master control modules (the second arbitration), and only one master control module acquires the control right over the communication bus eventually. The master control module acquired the control right over the communication bus is configured to read at least part of edge information of the video information received by the slave control modules via the communication bus and release the control over the communication bus upon the reading process. In this case, other master control modules again fight for the control right over the communication bus, and/or, other master control modules again determine whether the communication bus is occupied by the other master control modules themselves based on the address information.

Continuing the above example, the master control modules corresponding to the display screen modules 2, 4 and 5 fight for the control right over the communication bus. By taking the master control module corresponding to the display screen module 2 acquiring the control right over the communication bus at first as an example, the control module corresponding to the display screen module 2 reads at least part of edge information of the video information received by the control module corresponding to the display screen module 1 via the communication bus, and the "at least part of edge information" is the edge information A shown in FIG. 3. Upon reading, the control module corresponding to the display screen module 2 releases the control over the communication bus. Then, other master control modules, that is, the control module corresponding to the display screen module 4 and the control module corresponding to the display screen module 5, continue to fight for the control right over the communication bus. Upon release of the control right over the communication bus by the control module corresponding to the display screen module 4 and the control module corresponding to the display screen module 5, other control modules than the control modules corresponding to the display screen modules 2, 4 and 5 continue to determine whether the communication bus is occupied by themselves based on the address information, that is, repeat the above processes of the determination of the master control module and the salve control modules.

Furthermore, the control module is configured to perform imaging processing on the received video information and multiple pieces of the at least part of edge information in response to reading the multiple pieces of the at least part of edge information from the at least part of other control modules, such that image sub-information for displaying is generated. The plurality of display screen modules are configured to display received image sub-information. The "at least part of other control modules" is the same as the "at least part of other control modules" in the "address information of at least part of other control modules than the each of the plurality of control modules." As only one of the at least part of edge information corresponding to the slave control module is read in one occupation of the communication bus by the master control module, for one control module, in the case that several "at least the part of the other control modules" corresponding to the control module are present, several occupations of the communication bus are required to read at least part of edge information of the video information received by other control modules in the "at least the part of the other control modules," such that the multiple pieces of the at least part of edge information are acquired to form the edge information of the video information received by the control modules for the subsequent image processing. Specifically, as shown in FIG. 1, the control module processes the received video information and the multiple pieces of the at least part of edge information by calling the image processing algorithm and using the 5×5 filter kernel and the step size of 1, such that the image displayed by the control module is optimized, the smoother transitional screen between the spliced display screens is displayed, and the uniformity of the display effect of the spliced display screen is improved.

In the spliced display screen in the embodiments of the present disclosure, the image processing algorithm is configured in the control modules corresponding to the display screen modules. Compared with the case that the image processing algorithm is configured in the external splicing system for the spliced display screen and the splicing system possesses a great image processing capacity in the traditional technology, the control module in the present disclosure shares the pressure of the image processing algorithm in image processing processes. Specifically, each control module only needs to process the screen for displaying by the each control module, and thus the hashrate of the image processing algorithm in the control module is greatly reduced. In addition, the communication bus in the embodiments of the present disclosure achieves the communicable connection between the control modules, and the control module utilizes the data transition function of the communication bus and the logic function of the "arbitration" mechanism, such that the master control module acquires the edge information of the slave control modules without conflict via the communication bus, and the display effect with the great consistence in the splicing displaying is acquired upon the complete supplement of the edge information of the video information received by the control modules. In addition, in the traditional technology, the image processing algorithm is configured in the external splicing system for the spliced display screen, and thus the splicing mode of the display screen modules in the spliced display screen affects the processing of the image processing algorithm on the images displayed on the display screens. For example, in the case that the splicing mode of the display screen modules changes, an image engine of the splicing system requires to be correspondingly adjusted. In the embodiments of the present disclosure, the image processing algorithm is configured in the control modules corresponding to the display screen modules, and thus the splicing mode of the display screen modules spliced with each other in the spliced display screen is not limited, such that the flexibility of splicing the display screen modules is greatly improved, and the display screen modules are spliced arbitrarily.

The first arbitration process is described in detail hereinafter. In some embodiments, the control module is configured to sequentially send data bits of the address information to the communication bus, and determine that the communication bus is occupied by the control module in response to a currently-sent data bit being a low level and a logic level of the communication bus being adjusted to the low level. The communication bus is configured to adjust the logic level of the communication bus to the low level in response to a logic level of a data bit of the received address information sent by any of the plurality of control modules being the low level. The logic level of the communication bus in the initial state is the high level.

The data bits of the address information include a plurality of data bits, and a number of the data bits is correlated with a number of the control modules in the spliced display screen. As a number of the display screen modules spliced with each other in the spliced display screen is not limited in the embodiments of the present disclosure, the data bits of the address information are also not limited in the embodiments of the present disclosure. Illustratively, in the case that the spliced display screen is composed of spliced 4*4 display screen modules, the address information is 15 bit data bits, address information of the display screen module 1 is 000000000000000, address information of the display screen module 2 is 000000000000001, . . . , address information of the display screen module 6 is 111111111111111.

The embodiments of the present disclosure are described by taking the data bits of the address information being seven-bit data bits as an example. Continuing the above example, address information of the display screen module 1 is seven-bit 0000000, address information of the display screen module 2 is seven-bit 0000001, address information of the display screen module 3 is seven-bit 0000011, address information of the display screen module 4 is seven-bit 0000111, address information of the display screen module 5 is seven-bit 0001111, and address information of the display screen module 6 is seven-bit 0011111.

Continuing the above example, the control module sequentially sends the address information to the communication bus in an order of the seven-bit data bits. The control module corresponding to the display screen module 1 simultaneously sends first bits of 0000001, 0000111, and 0001111, and the first bits are "1," "1," and "1." The control module corresponding to the display screen module 2 simultaneously sends first bits of 0000000, 0000011, 0000111, 0001111, and 0011111, and the first bits are "0," "1," "1," "1," and "1." The control module corresponding to the display screen module 3 simultaneously sends first bits of 0000001, 0001111, and 0011111, and the first bits are "1," "1," and "1." The control module corresponding to the display screen module 4 simultaneously sends first bits of 0000000, 0000001, and 0001111, and the first bits are "0," "1," and "1." The control module corresponding to the display screen module 5 simultaneously sends first bits of 0000000, 0000001, 0000001, 0000011, 0000111 and 0011111, and the first bits are "0," "1," "1," "1," and "1." The control module corresponding to the display screen module 6 simultaneously sends first bits of 0000001, 0000011, and 0001111, and the first bits are "1," "1," and "1." As the communication bus possesses the "wired and" logic function, in the case that the communication bus is connected to the low level 0, the high-level initial logic state of the communication bus is adjusted to the low level state. In the case that the control modules corresponding to the display screen modules 2, 4 and 5 send the first data bits in the address information corresponding to the other control modules, the first bit of the address information of 0000000 is the low level, and the logic level of the communication bus is adjusted to the low level under the action of the "wired and" logic function, such that the control modules corresponding to the display screen modules 2, 4 and 5 occupy the communication bus.

In the first fight for the occupation of the communication bus among the plurality of control modules in the spliced display screen, the control modules corresponding to the display screen modules 2, 4 and 5 are determined as the master control modules, the control module corresponding to the display screen module 1 is determined as the slave control module, and the control modules corresponding to the display screen modules 1, 3, and 6 wait for a next fight for the occupation of the communication bus. Specifically, the next fight for the occupation of the communication bus is started upon the release of the control over the communication bus by the control modules corresponding to the display screen modules 2, 4 and 5.

In the embodiments of the present disclosure, the first arbitration is finished based on the "wired and" logic function of the communication bus and detection of the logic level of the currently-sent data bit and the logic level of the communication bus by the control module, and the master control module and the slave control module are determined from the plurality of control modules, such that the master control module reads the edge information of the slave control modules without conflict via the communication bus, and the display effect of the spliced display screen with the great consistence in the splicing displaying process is acquired upon the complete supplement of the edge information of the video information received by the control modules.

In some embodiments, the edge signal supplement request carries at least one data byte, and a first bit of the data byte is configured to represent a data bit of read control or write control, denoted as a read/write control bit R/W. In the case that a logic level of the control bit is the low level 0, the master control module writes data to the slave control module. In the case that a logic level of the control bit is the high level 1, the master control module reads data from the slave control module.

Illustratively, the edge signal supplement request carries one data byte, that is, 8 bit data bit. The data byte includes seven data bits for representing the address information and a first data bit for the read control or write control.

The slave control module is configured to detect, in response to the edge signal supplement request and a received first data bit being a write control bit, whether the received address information is coincident with predetermined address information.

The slave control module detects that the first data bit is the write control bit, that is, the slave control module detects that the logic level of the first data bit is the low level 0. Then, the slave control module sequentially determines, based on the sequence of the data bits of the received address information, whether the data bits of the address information are coincident with the data bits of the predetermined address information in response to the subsequent data bits.

Figure 6:
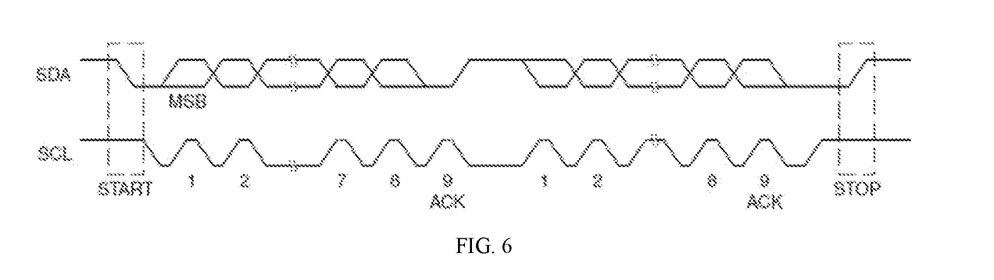
FIG. 6 is a schematic diagram of signal waveforms of communication via an I2C bus according to some embodiments of the present disclosure.

Furthermore, the slave control module is configured to feed back a response signal to the master control module in response to the received address information being coincident with the predetermined address information. The slave control module feeding back the response signal to the master control module indicates that the master control module is capable of reading the edge information of the slave control module in the subsequent processes. The predetermined address information is the address information of the slave control module predetermined by the user, and is stored in the slave control module. Illustratively, as shown in FIG. 6, the slave control module feeds back the response signal ACK at the ninth clock device of the communication bus.

In the above method, the slave control module accurately feeds back and responds to the master control module by verifying the address information, and thus the master control module is avoided reading error address information in the subsequent processes, such that the accuracy of processing images by the master control module is improved, and the display effect of the spliced display screen is improved.

The master control module is configured to receive the response signal from the slave control modules, and read, in response to acquiring the control right over the communication bus, a part of edge information of the video information received by the slave control modules via the communication bus; and release the control over the communication bus.

Although the master control module has received the response signal from the slave control modules, the master control modules occupying the communication bus may be in several cases. For avoiding conflict between the requests of the master control modules, the second arbitration is set to screen out a master control module having a final control right over the communication bus from the plurality of master control modules.

Figure 4:
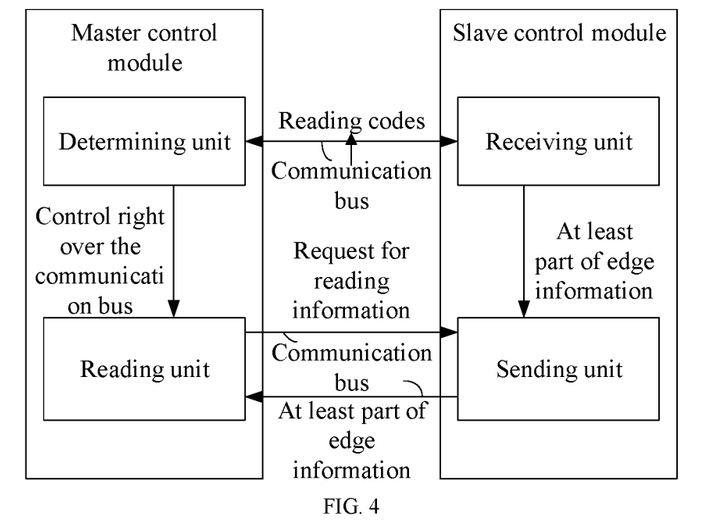
FIG. 4 is a schematic structural diagram of a master control module and a slave control module according to some embodiments of the present disclosure.

The second arbitration process is described in detail hereinafter. In some embodiments, each master control module is further configured to determine whether the each master control module has the control right over the communication bus in the case that the communication bus is occupied by a plurality of master control modules simultaneously. FIG. 4 is a schematic structural diagram of a master control module and a slave control module according to some embodiments of the present disclosure. As shown in FIG. 4, the master control module includes a determining unit and a reading unit.

The determining unit is configured to send preconfigured reading codes to the slave control modules, and determine, based on the reading codes, whether the master control module has the control right over the communication bus. The preconfigured reading codes are at least one preconfigured data character stored in the master control module and representing a position region of the at least part of edge information in the video information received by the slave control module and to-be-read by the master control module. It should be noted that the master control module stores a plurality of preconfigured reading codes, and one preconfigured reading codes corresponding to one of the "at least the part of the other control modules." The "at least the part of the other control modules" here is the same as the "at least the part of the other control modules" in the above embodiments.

Specifically, the master control module acquires the preconfigured reading codes corresponding to the slave control module based on the response signal upon receival of the response signal from the slave control module. Continuing the above example, as shown in FIG. 3, the master control module is the control module corresponding to the display screen module 2, the slave control module is the control module corresponding to the display screen module 1, the control module corresponding to the display screen module 2 acquires the preconfigured reading codes corresponding to the control module corresponding to the display screen module 1 upon receival of the response signal from the control module corresponding to the display screen module 1.

Figure 5A:
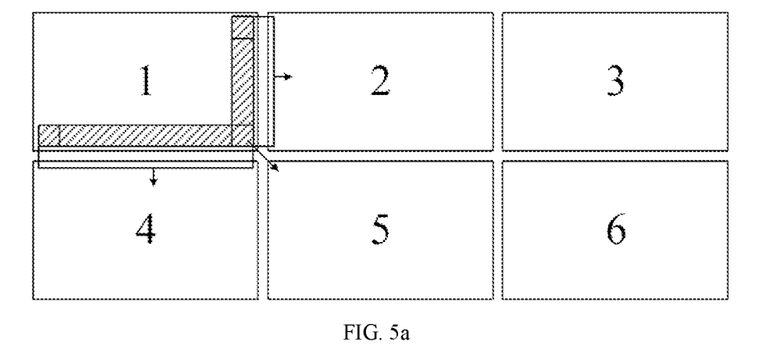
FIG. 5a is a schematic diagram of a request for reading edge information by a master control module according to some embodiments of the present disclosure.
Figure 5B:
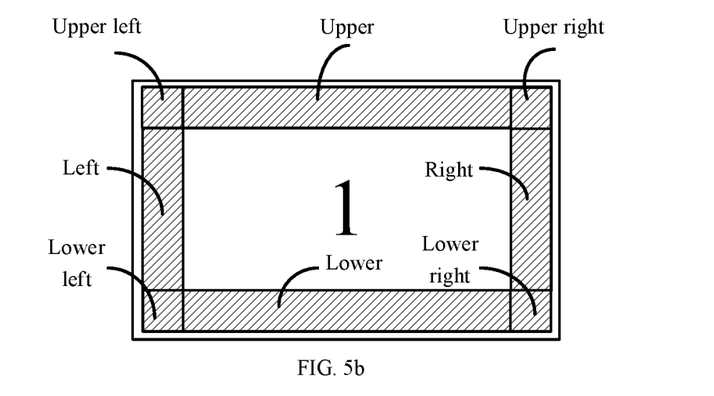

For example, the reading code is an eight-bit data signal, and is "1" representing a high level and "0" representing a low level in a logic level. FIG. 5a is a schematic diagram of a request for reading edge information by a master control module according to some embodiments of the present disclosure, and FIG. 5b is a schematic diagram of division of an edge position region of a display screen module 1 in FIG. 5a. As shown in FIG. 5a and FIG. 5b, the master control module is configured with the reading codes in a circular order from left to right, top to bottom, right to left, and bottom to top to read the at least part of the edge information of the video information received by the slave control module. The eight-bit data bit represents pixels at an upper left region of the video information, pixels at an upper region of the video information, pixels at an upper right region of the video information, pixels at a right region of the video information, pixels at a lower right region of the video information, pixels at a lower region of the video information, pixels at a lower left region of the video information, and pixels at a left region of the video information. The reading code being 1 indicates that the edge pixels at the position region corresponding to the current data bit do not belong to edge pixels to be read by the master control module, and the reading code being 0 indicates that the edge pixels at the position region corresponding to the current data bit belong to edge pixels to be read by the master control module. Continuing the above example, as shown in FIG. 3 and FIG. 5a, the master control modules are the control modules corresponding to the display screen modules 2, 4 and 5, and the slave control module is the control module corresponding to the display screen module 1. The preconfigured reading codes corresponding to the display screen module 1 acquired by the control module corresponding to the display screen module 2 are 11100011, the preconfigured reading codes corresponding to the display screen module 1 acquired by the control module corresponding to the display screen module 4 are 10001111, and the preconfigured reading codes corresponding to the display screen module 1 acquired by the control module corresponding to the display screen module 5 are 11101111.

Whether the master control module has the control right over the communication bus is determined. Specifically, the determining unit is configured to sequentially send data bits of the reading codes to the communication bus, and determine whether a logic level of a currently-sent data bit is coincident with a logic level of the communication bus at the current time each time one of the data bits is sent; and determine that the master control module has the control right over the communication bus in response to the logic level of the currently-sent data bit being coincident with the logic level of the communication bus at the current time and the logic level of the currently-sent data bit being a low level.

Continuing the above example, the control modules corresponding to the display screen modules 2, 4 and 5 both send first data bits of the reading codes to the communication bus. As the first data bits both are 1, the high level state of the communication bus is unchanged. In this case, the determining unit determines that the logic level of the currently-sent data bit is coincident with the logic level of the communication bus at the current time, and thus the control modules corresponding to the display screen modules 2, 4 and 5 continue to occupy the communication bus. For second data bits of the reading codes, the determining process is similar to the above determining process, which is not repeated herein. For third data bits of the reading codes, the control module corresponding to the display screen module 2 send the third data bit 0 of the reading codes to the communication bus, the control module corresponding to the display screen module 4 send the third data bit 1 of the reading codes to the communication bus, and the control module corresponding to the display screen module 5 send the third data bit 1 of the reading codes to the communication bus. On this basis, the communication bus is adjusted from the high level state to the low level state based on the "wired and" logic function of the communication bus, and the determining unit of the control module corresponding to the display screen module 2 determines that the logic level (that is, the low level 0) of the currently-sent third data bit is coincident with the logic level of the communication bus at the current time (that is, adjusted to the low level 0) and both are the low level. The determining unit of the control module corresponding to the display screen module 4 determines that the logic level (that is, the high level 1) of the currently-sent third data bit is not coincident with the logic level of the communication bus at the current time (that is, adjusted to the low level 0), and the determining unit of the control module corresponding to the display screen module 5 determines that the logic level (that is, the high level 1) of the currently-sent third data bit is not coincident with the logic level of the communication bus at the current time (that is, adjusted to the low level 0). Thus, the master control module corresponding to the display screen module 2 acquires the final control right over the communication bus.

The reading unit is configured to send an information read request to the slave control modules in response to the master control module having the control right over the communication bus, and read the at least part of edge information fed back from the slave control modules via the communication bus; and release the control over the communication bus for the new occupation of the communication bus among the other control modules. The slave control module includes a receiving unit and a sending unit. The receiving unit is configured to determine, in response to the received reading codes, the at least part of edge information of the received video information, and the sending unit is configured to send the at least part of edge information to the reading unit in response to the received information read request.

In the case that the determining unit sequentially sends the data bits of the reading codes to the communication bus, the receiving unit receives the reading codes transmitted by the communication bus, determines at least one position region of the video information received by the slave control module including the determining unit based on the data bits of the reading codes, and acquires the edge pixels corresponding to the position regions. In response to the received information read request, as the master control module has the control right over the communication bus, and thus the sending unit is configured to determine the edge pixels corresponding to the position regions as at least the part of the edge information and send to the reading unit of the master control module via the communication bus. Then, the reading unit reads the at least part of edge information fed back from the slave control modules via the communication bus, and the master control module releases the control over the communication bus upon the reading of the reading unit for the new occupation of the communication bus among the other control modules.

Detailed processing processes of the spliced display screen are described by the following specific example. The control modules send the edge signal supplement request to other control modules upon receival of the corresponding video information, and two arbitration processes are performed among the control modules and the communication bus in the subsequent processes. The first arbitration process is to screen out a master control module and a slave control module from the plurality of control modules, and the other arbitration process is to fight for the control right over the communication bus among at least one master control module.

As shown in FIG. 3, the request of the control modules on the control module 1 is first responded, the request of the control modules on the control module 2 is then responded, so on in a serpentine arrangement until the requests of all control modules have been responded. Specifically, FIG. 6 is a schematic diagram of signal waveforms of communication via an I2C bus according to some embodiments of the present disclosure. As shown in FIG. 6, by taking the communication bus being the I2C bus as an example, the control modules control the I2C bus by a start signal START, then send the edge signal supplement request upon sending the start signal START to the communication bus, and address the slave control module based on the address information carried in the edge signal supplement request. The clock signal line SCL maintains in the high level and the data signal line SDA is changed from the high level to the low level to represent the initial signal, and the signal line SCL maintains in the high level and the data signal line SDA is changed from the low level to the high level to represent the stop signal.

Continuing the above example, the control modules 2, 4 and 5 win the first arbitration fight and occupy the I2C bus. The control modules 2, 4 and 5 are determined as the master control modules, and the control module 1 is determined as the slave control module. All master control modules send the reading codes related to the control module 1. Then master control module 2 wins the second arbitration fight and has the final control right over the communication bus. The master control module 2 sends the information read request to the slave control module 1, the slave control module 1 feeds back the at least part of edge information of the received video information to the master control module 2 based on the reading codes, and the master control module 2 releases the I2C bus by the stop signal STOP. As shown in FIG. 6, the most significant bit (MSB) is in the front on each transmission of the data byte.

In the above embodiments, the control module causes that only one of the plurality of master control modules has the control right over the communication bus at the same time based on the logic function of the "arbitration" mechanism of the communication bus, such that the master control modules read the edge information of the slave control modules without conflict via the communication bus, and the efficiency of reading information is improved.

Figure 7:
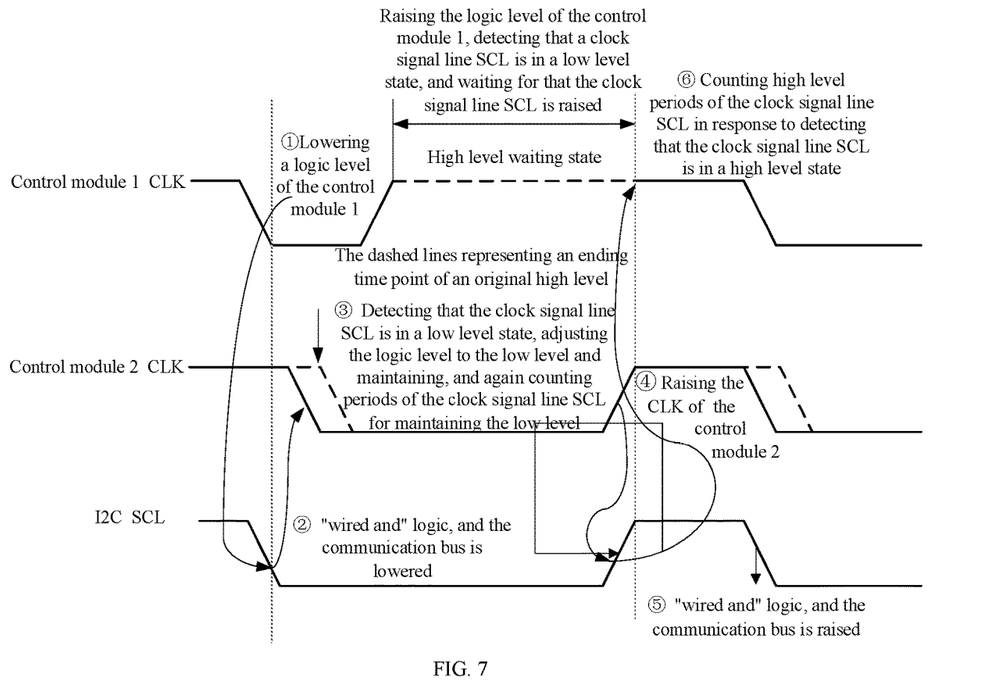
FIG. 7 is a schematic diagram of signal waveforms of a plurality of control modules and a communication bus with simultaneous clocks according to some embodiments of the present disclosure.

In some embodiments, the control module further includes a clock unit CLK, and an initial state of a logic level of the clock unit CLK is a high level state. The communication bus includes a data signal line SDA and a clock signal line SLC, and an initial state of a logic level of the clock signal line CLK is the high level state. The data signal line SDA of the communication bus is configured to transmit the data signal in the data byte in the above embodiments, the clock signal line SLC is configured to adjust the log is level state in response to the clock signal, and the clock signal line CLK includes a clock interface of the control module. FIG. 7 is a schematic diagram of signal waveforms of a plurality of control modules and a communication bus with simultaneous clocks according to some embodiments of the present disclosure, as shown in FIG. 7.

The clock unit CLK is configured to detect the logic level of the clock signal line SLC; adjust the logic level in the high level state to a low level in response to a shift of the logic level of the clock signal line SLC from the high level to the low level, and adjust the logic level in a low level state to the high level upon maintaining of the low level state for a predetermined low level period; adjust the clock signal line SLC to be in a high level waiting state in response to the logic level of the clock signal line SLC being maintained at the low level state; count high level periods of the clock signal line SLC in response to a shift of the logic level of the clock signal line SLC from the low level to the high level, and adjust the logic level of the clock signal line SLC in the high level state to the low level in response to the high level periods of the clock signal line SLC being less than high level periods of the clock unit CLK of any of the other control modules. The clock signal line SLC is configured to detect logic levels of the clock units CLK of the plurality of control modules in response to a shift of the logic level of the clock signal line SLC from the high level to the low level and maintaining of the logic level of the clock signal line SLC at the low level state; and adjust the logic level of the clock signal line SLC to the high level in response to the logic levels of the clock units CLK of the plurality of control modules being the high level.

Illustratively, as shown in FIG. 7, a "wired and" logic relationship is present between the clock unit CLK and the I2C clock signal line SLC. The clock unit CLK lowers the logic level of the clock unit CLK to the low level state upon detecting that the logic level of the clock signal line SLC is the low level 0, counts down a duration in the low level state of the clock unit CLK, that is, the predetermined low level period, until one predetermined low level period ends, and then raises the logic level of the clock unit CLK to the high level state. In the case that there is other clock unit CLK with the logic level being in the low level, the I2C clock signal line SLC is in the low level state due to the "wired and" logic. The clock unit CLK adjusts itself to a high level waiting state in response to the logic level of the clock signal line SLC being maintained at the low level state. The phase of the high level waiting state is from a case of maintaining of the high level state to a case of the clock signal line SLC changing from the low level to the high level. In the case that all clock units CLK finish count of the low level periods, the clock signal line SLC is released and changed to the high level. The state of the logic level of the clock units CLK and the state of the logic level of the clock signal lines SLC are coincident and are the high level state. The clock unit CLK always detects the logic level of the clock signal line SLC, and counts the high level periods of the clock unit CLK in response to detecting that the logic level of the clock signal line SLC changes from the low level to the high level. In the clock units CLK, a first clock unit CLK finishing the high level period lowers the logic level again, and thus synchronous I2C bus clock is generated. In some embodiments, a low level period of the clock signal line SLC is greater than a low level period of any clock unit CLK. A low level period of the I2C clock signal line SLC is determined by the clock unit CLK with the longest low level period, and a high level period of the I2C clock signal line SLC is determined by the clock unit CLK with the shortest high level period.

In the embodiments of the present disclosure, based on the clock synchro of the communication bus, the master control modules read the edge information of the slave control modules without conflict via the communication bus, and the efficiency of reading information is improved.

In a second aspect, the embodiments of the present disclosure further provide a control system for a spliced display screen. The control system for the spliced display screen includes the spliced display screen in the above embodiments in the first aspect. Detailed descriptions of the spliced display screen in the control system for the spliced display screen are referred to the detailed descriptions of the spliced display screen in the above embodiments, which are not repeated herein.

Figure 8:
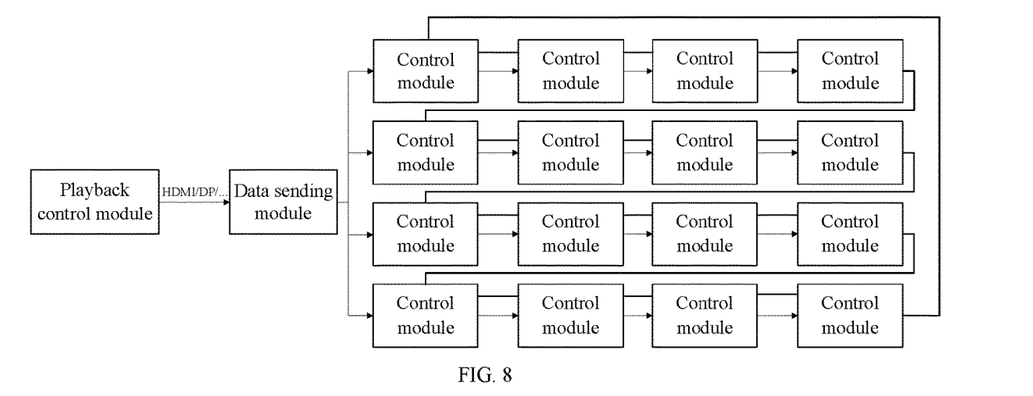
FIG. 8 is schematic structural diagram of a control system for a spliced display screen according to some embodiments of the present disclosure.

In some embodiments, FIG. 8 is schematic structural diagram of a control system for a spliced display screen according to some embodiments of the present disclosure. As shown in FIG. 8, the control system for the spliced display screen further includes a playback control module and a data sending module. The playback control module is configured to send a video stream to the data sending module via a video interface. Specifically, the video stream for displaying is determined according to a playback plan, and is sent to the data sending module via the video interface. The playback plan is a predetermined identification of a target spliced display screen, a playback duration, a cycled playback number, and the like. The video interface is a high-definition multimedia interface (HDMI), a display port (DP), and the like.

The data sending module is configured to acquire video information corresponding to the plurality of control modules by blocking each video frame in the video stream based on the video stream, a video resolution of the video stream, and a number of display screen modules; and send the video information to the corresponding control modules.

The video definition is the definition of each frame of image in the video stream. In one splitting mode, the spliced display screen includes M*N display screen modules spliced with each other. Each frame of video frame in the video stream is split to M*N video information based on the video definition, and one acquired video information corresponds to one control module. Each video information in the M*N video information is correlated with the address information of the corresponding control module, and the corresponding video information is sent to the control module.

Specifically, the data sending module includes a configuring unit, a blocking unit, and a sending unit. The configuring unit is configured to receive configuration information from a user terminal, and the configuration information includes address information of the plurality of control modules and the number of the display screen modules. The blocking unit is configured to acquire the video information corresponding to the plurality of control modules by blocking each video frame in the video stream based on the video stream, the video resolution of the video stream, and the number of display screen modules. The sending unit is configured to send the video information to the corresponding control modules based on the address information of the plurality of control modules.

The spliced display screen is configured to display the received video information. Detailed processing process and the display process are referred to the detailed descriptions of the spliced display screen in the first aspect, which are not repeated herein.

The embodiments of the present disclosure provide a control system for a spliced display screen including a spliced display screen. In the spliced display screen, the image processing algorithm is configured in the control modules corresponding to the display screen modules, such that the data sending module (such as the splicing system in the traditional technologies) does not require to possess a great capability of processing images. The pressure of the image processing algorithm in image processing processes is shared by the control modules in the present disclosure. Specifically, each control module only needs to process the screen for displaying, and thus the hashrate of the image processing algorithm in the control module is greatly reduced.

It can be understood that the above embodiments are exemplary embodiments for illustrating the principles of the present disclosure, and should not be construed as limiting the present disclosure. A person of ordinary skill in the art can obtain variations and improvements without departing from the spirit or essence of the present disclosure, the variations and improvements are within the scope of the protection of the present disclosure.

The invention claimed is:

1. A spliced display screen, comprising: a plurality of display screen modules spliced with each other, a plurality of control modules, and a communication bus; wherein
   one of the plurality of display screen modules corresponds to one of the plurality of control modules, an image processing algorithm is configured in each of the plurality of control modules, and the plurality of control modules are communicably connected via the communication bus;
   the each of the plurality of control modules is configured to:
   send an edge signal supplement request to other control modules in the spliced display screen in response to received video information, wherein the edge signal supplement request carries address information of at least part of other control modules than the each of the plurality of control modules;
   determine, based on the address information, whether the communication bus is occupied by the each of the plurality of control modules;
   determine the each of the plurality of control modules as a master control module and other control modules corresponding to the address information occupying the communication bus as slave control modules in response to the communication bus being occupied by the each of the plurality of control modules;
   read at least part of edge information of the video information received by the slave control modules via the communication bus in response to acquiring a control right over the communication bus;
   release control over the communication bus for a new occupation of the communication bus among the other control modules; and
   perform imaging processing on the received video information and multiple pieces of the at least part of edge information in response to reading the multiple pieces of the at least part of edge information from the at least part of other control modules, such that image sub-information for displaying is generated; and
   the plurality of display screen modules are configured to display received image sub-information; and
   wherein
   in a case that the communication bus is occupied by a plurality of master control modules simultaneously, each of the plurality of master control modules is further configured to determine whether the each of the plurality of master control modules has the control right over the communication bus;
   the each of the plurality of master control modules comprises a determining unit and a reading unit; wherein
   the determining unit is configured to send preconfigured reading codes to the slave control modules, and determine, based on the reading codes, whether the each of the plurality of master control modules has the control right over the communication bus; and
   the reading unit is configured to send an information read request to the slave control modules in response to the each of the plurality of master control modules having the control right over the communication bus, and read the at least part of edge information fed back from the slave control modules via the communication bus; and release the control over the communication bus for the new occupation of the communication bus among the other control modules;
   each of the slave control modules comprises a receiving unit and a sending unit; wherein
   the receiving unit is configured to determine the at least part of edge information of the received video information in response to the received reading codes; and
   the sending unit is configured to send the at least part of edge information to the reading unit in response to the received information read request.

2. The spliced display screen according to claim 1, wherein the determining unit is configured to sequentially send data bits of the reading codes to the communication bus, and determine whether a logic level of a currently-sent data bit is coincident with a logic level of the communication bus at a current time each time one of the data bits is sent; and determine that the each of the plurality of master control modules has the control right over the communication bus in response to the logic level of the currently-sent data bit being coincident with the logic level of the communication bus at the current time and the logic level of the currently-sent data bit being a low level.

3. The spliced display screen according to claim 1, wherein
   the each of the plurality of control modules is configured to sequentially send data bits of the address information to the communication bus, and determine that the communication bus is occupied by the each of the plurality of control modules in response to a currently-sent data bit being a low level and a logic level of the communication bus being adjusted to the low level; and
   the communication bus is configured to adjust the logic level of the communication bus to the low level in response to a logic level of a data bit of the received address information sent by any of the plurality of control modules being the low level.

4. The spliced display screen according to claim 1, wherein
   the edge signal supplement request carries at least one data byte, wherein a first bit of the data byte is configured to represent a data bit of read control or write control;
   each of the slave control modules is configured to detect, in response to the edge signal supplement request and a received first data bit being a write control bit, whether the received address information is coincident with predetermined address information; and feed back a response signal to the each of the plurality of master control modules in response to the received address information being coincident with the predetermined address information; and
   the each of the plurality of master control modules is configured to receive the response signal from the each of the slave control modules, and read, in response to acquiring the control right over the communication bus, part of edge information of the video information received by the slave control modules via the communication bus; and release the control over the communication bus.

5. The spliced display screen according to claim 1, wherein
the each of the plurality of control modules further comprises a clock unit, wherein an initial state of a logic level of the clock unit is a high level state;
the communication bus comprises a data signal line and a clock signal line, wherein an initial state of a logic level of the clock signal line is the high level state;
the clock unit is configured to detect the logic level of the clock signal line; adjust the logic level in the high level state to a low level in response to a shift of the logic level of the clock signal line from the high level to the low level, and adjust the logic level in a low level state to the high level upon maintaining of the low level state for a predetermined low level period; adjust the clock signal line to be in a high level waiting state in response to the logic level of the clock signal line being maintained at the low level state; count high level periods of the clock signal line in response to a shift of the logic level of the clock signal line from the low level to the high level, and adjust the logic level of the clock signal line in the high level state to the low level in response to the high level periods of the clock signal line being less than high level periods of the clock unit of any of the other control modules; and
the clock signal line is configured to detect logic levels of the clock units of the plurality of control modules in response to the shift of the logic level of the clock signal line from the high level to the low level and maintaining of the logic level of the clock signal line at the low level state; and adjust the logic level of the clock signal line to the high level in response to the logic levels of the clock units of the plurality of control modules being high levels.

6. The spliced display screen according to claim 5, wherein a low level period of the clock signal line is greater than a low level period of any clock unit.

7. A control system for a spliced display screen, comprising the spliced display screen, wherein the spliced display screen comprises: a plurality of display screen modules spliced with each other, a plurality of control modules, and a communication bus; wherein
one of the plurality of display screen modules corresponds to one of the plurality of control modules, an image processing algorithm is configured in each of the plurality of control modules, and the plurality of control modules are communicably connected via the communication bus;
the each of the plurality of control modules is configured to:
send an edge signal supplement request to other control modules in the spliced display screen in response to received video information, wherein the edge signal supplement request carries address information of at least part of other control modules than the each of the plurality of control modules;
determine, based on the address information, whether the communication bus is occupied by the each of the plurality of control modules;
determine the each of the plurality of control modules as a master control module and other control modules corresponding to the address information occupying the communication bus as slave control modules in response to the communication bus being occupied by the each of the plurality of control modules;
read at least part of edge information of the video information received by the slave control modules via the communication bus in response to acquiring a control right over the communication bus;
release control over the communication bus for a new occupation of the communication bus among the other control modules; and
perform imaging processing on the received video information and multiple pieces of the at least part of edge information in response to reading the multiple pieces of the at least part of edge information from the at least part of other control modules, such that image sub-information for displaying is generated; and
the plurality of display screen modules are configured to display received image sub-information; and
wherein
in a case that the communication bus is occupied by a plurality of master control modules simultaneously, each of the plurality of master control modules is further configured to determine whether the each of the plurality of master control modules has the control right over the communication bus;
the each of the plurality of master control modules comprises a determining unit and a reading unit; wherein
the determining unit is configured to send preconfigured reading codes to the slave control modules, and determine, based on the reading codes, whether the each of the plurality of master control modules has the control right over the communication bus; and
the reading unit is configured to send an information read request to the slave control modules in response to the each of the plurality of master control modules having the control right over the communication bus, and read the at least part of edge information fed back from the slave control modules via the communication bus; and release the control over the communication bus for the new occupation of the communication bus among the other control modules;
each of the slave control modules comprises a receiving unit and a sending unit; wherein
the receiving unit is configured to determine the at least part of edge information of the received video information in response to the received reading codes; and
the sending unit is configured to send the at least part of edge information to the reading unit in response to the received information read request.

8. The control system for the spliced display screen according to claim 7, further comprising: a playback control module and a data sending module; wherein
the playback control module is configured to send a video stream to the data sending module via a video interface;
the data sending module is configured to acquire video information corresponding to the plurality of control modules by blocking each video frame in the video stream based on the video stream, a video resolution of the video stream, and a number of display screen modules; and send the video information to the corresponding control modules; and
the spliced display screen is configured to display the received video information.

9. The control system for the spliced display screen according to claim 8, wherein the data sending module comprises a configuring unit, a blocking unit, and a sending unit; wherein the configuring unit is configured to receive configuration information from a user terminal, wherein the configuration information comprises address information of the plurality of control modules and the number of the display screen modules;

the blocking unit is configured to acquire the video information corresponding to the plurality of control modules by blocking each video frame in the video stream based on the video stream, the video resolution of the video stream, and the number of display screen modules; and the sending unit is configured to send the video information to the corresponding control modules based on the address information of the plurality of control modules.

10. The control system for the spliced display screen according to claim 7, wherein the determining unit is configured to sequentially send data bits of the reading codes to the communication bus, and determine whether a logic level of a currently-sent data bit is coincident with a logic level of the communication bus at a current time each time one of the data bits is sent; and determine that the each of the plurality of master control modules has the control right over the communication bus in response to the logic level of the currently-sent data bit being coincident with the logic level of the communication bus at the current time and the logic level of the currently-sent data bit being a low level.

11. The control system for the spliced display screen according to claim 7, wherein the each of the plurality of control modules is configured to sequentially send data bits of the address information to the communication bus, and determine that the communication bus is occupied by the each of the plurality of control modules in response to a currently-sent data bit being a low level and a logic level of the communication bus being adjusted to the low level; and the communication bus is configured to adjust the logic level of the communication bus to the low level in response to a logic level of a data bit of the received address information sent by any of the plurality of control modules being the low level.

12. The control system for the spliced display screen according to claim 7, wherein the edge signal supplement request carries at least one data byte, wherein a first bit of the data byte is configured to represent a data bit of read control or write control;

each of the slave control modules is configured to detect, in response to the edge signal supplement request and a received first data bit being a write control bit, whether the received address information is coincident with predetermined address information; and feed back a response signal to the each of the plurality of master control modules in response to the received address information being coincident with the predetermined address information; and the each of the plurality of master control modules is configured to receive the response signal from the each of the slave control modules, and read, in response to acquiring the control right over the communication bus, part of edge information of the video information received by the slave control modules via the communication bus; and release the control over the communication bus.

13. The control system for the spliced display screen according to claim 7, wherein the each of the plurality of control modules further comprises a clock unit, wherein an initial state of a logic level of the clock unit is a high level state;

the communication bus comprises a data signal line and a clock signal line, wherein an initial state of a logic level of the clock signal line is the high level state;

the clock unit is configured to detect the logic level of the clock signal line;

adjust the logic level in the high level state to a low level in response to a shift of the logic level of the clock signal line from the high level to the low level, and adjust the logic level in a low level state to the high level upon maintaining of the low level state for a predetermined low level period; adjust the clock signal line to be in a high level waiting state in response to the logic level of the clock signal line being maintained at the low level state; count high level periods of the clock signal line in response to a shift of the logic level of the clock signal line from the low level to the high level, and adjust the logic level of the clock signal line in the high level state to the low level in response to the high level periods of the clock signal line being less than high level periods of the clock unit of any of the other control modules; and the clock signal line is configured to detect logic levels of the clock units of the plurality of control modules in response to the shift of the logic level of the clock signal line from the high level to the low level and maintaining of the logic level of the clock signal line at the low level state; and adjust the logic level of the clock signal line to the high level in response to the logic levels of the clock units of the plurality of control modules being high levels.

14. The control system for the spliced display screen according to claim 13, wherein a low level period of the clock signal line is greater than a low level period of any clock unit.

* * * * *